(No Model.)
J. S. DU BOIS.
CONDUIT FOR ELECTRIC WIRES.
No. 314,568. Patented Mar. 31, 1885.
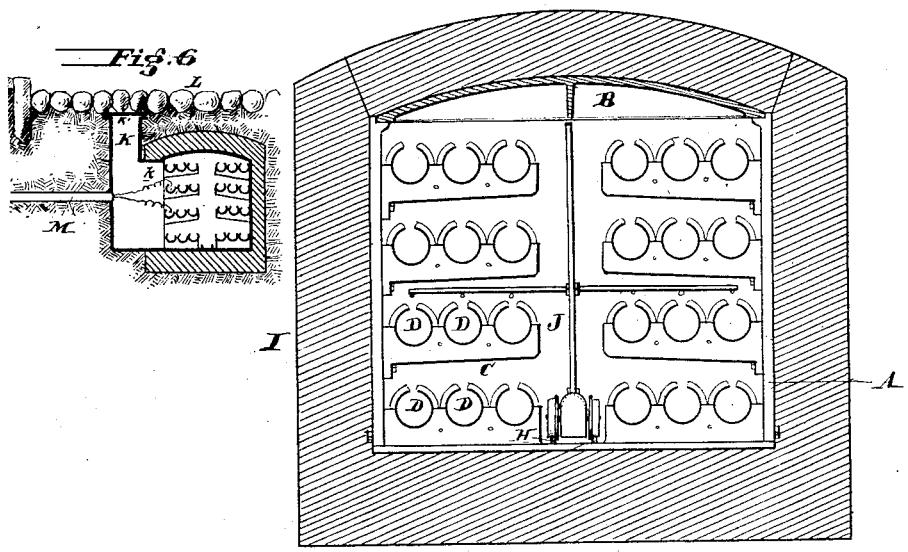
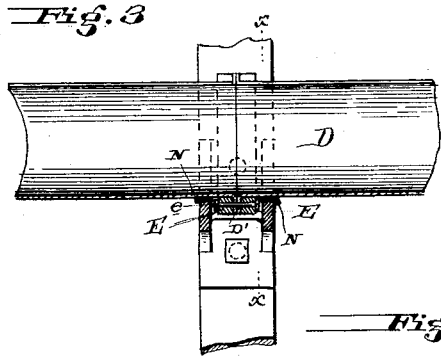
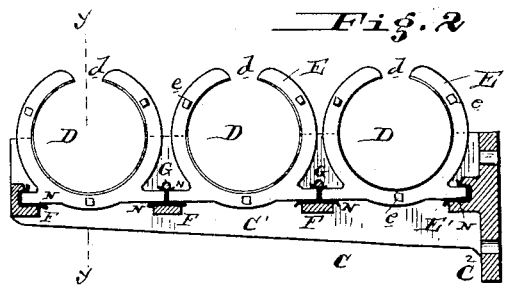
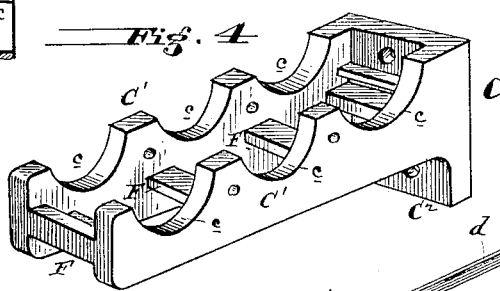
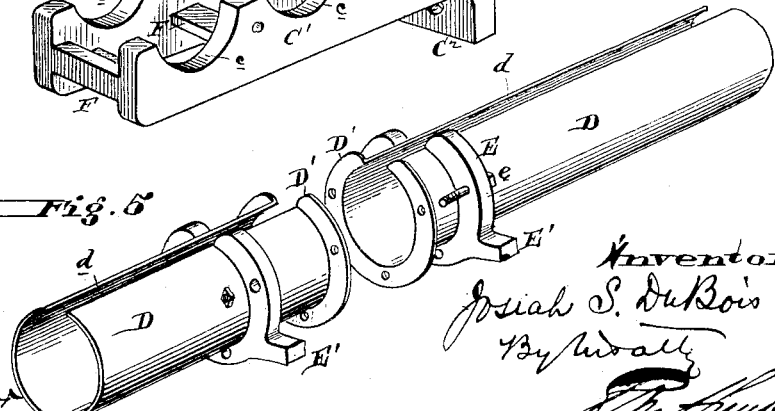
Attest
Homer A. Hart
G. E. Hummel.
Inventor
Josiah S. Du Bois
By his atty

UNITED STATES PATENT OFFICE.

JOSIAH S. DU BOIS, OF CAMDEN, NEW JERSEY.

CONDUIT FOR ELECTRIC WIRES.

SPECIFICATION forming part of Letters Patent No. 314,568, dated March 31, 1885.

Application filed September 6, 1884. (No model.)

*To all whom it may concern:*

Be it known that I, JOSIAH S. DU BOIS, of the city and county of Camden, in the State of New Jersey, have invented new and useful Improvements in Underground Conduits for Electric Wires, of which the following is a specification.

My invention has reference to underground conduits for electrical wires; and it consists in certain improvements upon Letters Patent granted to me February 13, 1883, and numbered 272,221, by which a more perfect construction of the wire-supporting troughs or pockets is obtained, all of which is fully set forth in the following specification and shown in the accompanying drawings, which form part thereof.

The object of my invention is to so construct the pockets or troughs that the wires may be more easily and surely laid therein and that the sections of said troughs or pockets may be united above ground and then laid in position, insuring a more perfect union and at a considerable reduction in cost.

In the drawings, Figure 1 is a sectional elevation of an underground conduit embodying my improvements. Fig. 2 is a sectional elevation on line $x\ x$ of one of the supporting-brackets and the troughs or pockets. Fig. 3 is a sectional elevation of same on line $y\ y$. Fig. 4 is a perspective view of the bracket. Fig. 5 is a perspective view showing the method of joining the trough or pocket sections; and Fig. 6 is a sectional elevation showing method of carrying off wires to houses, &c.

A are rectangular frames, to which the supporting-brackets C are bolted.

B is the cap or cover, and I is brick-work or cement, which forms the body of the conduit. The brackets C are arranged one above the other on each side of the frame A, leaving the space J, through which the motor for laying new cables or wires may run, it being guided by rails H. This motor is provided with arms, which extend over the brackets C, as desired, so as to lay the cable, cord, or wire in any pocket desired. The brackets C are formed of two side frames, C', united at one end by the flanges C², which act as a foot wherewith to secure the bracket to the frame A and cross-bars F, and said parts C' are scalloped, as at $c$, for the reception of the troughs or pockets D. The pockets D are made tubular and have a longitudinal slot, $d$, through which the wire, cable, or cord is deposited. These pockets are preferably made of galvanized iron, and while shown as cylindrical in cross-section it is evident that they might be made polygonal. These pockets may be made in short lengths of, say, eight to fifteen feet, and have their ends flanged, as at D'. The ends of two adjacent pockets are placed together, bringing the slots $d$ in line, and then bolted together by bolts $e$, which pass through split rings E, arranged back of each flange D'. By this means any length of pocket may be made above ground and then placed in the conduit before the covers B and top cement are put in position. These rings E fit in between the frames C' of the brackets C, and the pockets themselves rest upon the curved parts $c$ of said parts C'. To retain these pockets in place, I provide the rings E near their bottom and on each edge with lugs E', which rest upon the cross-bars F of the brackets C, and are prevented from rising by bolts G. If desired, these rings in each set of pockets on the same level and on each side may be made integral. In front of the houses or lamp-post I provide the conduit with vertical tubes or passages K, which open into the conduit and are brought to the surface or just under the paving-stones of the roadway L, and provided with a cap, K'. By this means a man can descend or put his arm down (dependent upon the size of the passage-way K) and connect the wires in the pockets D with a wire or wires entering said passage-way K through pipe M, extending from the house or place to be lighted or supplied with electricity, as shown in Fig. 6. It is also desirable that each trough or pocket D be insulated from all the others, and to do this I may place any insulating material, as rubber or paper N, in the brackets C, or around the pockets D and parts E, where they come into contact with the said brackets, to prevent an electric current passing from one pocket to another should it escape from a conductor or wire in any pocket.

Having now described my invention, what I claim as new, and desire to secure by Letters Patent, is—

1. An underground conduit provided with cylindrical pockets or troughs for supporting the electric wires, made of light sheet metal, cylindrical or polygonal in cross-section, and having a narrow longitudinal slot in its upper part, the said pockets being arranged side by side in rows in the same horizontal plane, and the rows being arranged one above the other, as shown, substantially as and for the purpose specified.

2. Two or more pockets for underground conduits formed of sheet metal, cylindrical or polygonal in cross-section, provided with outwardly-flanged ends, and having a longitudinal slot in their upper surfaces, in combination with clamping mechanism, substantially as set forth, to clamp said pockets end to end in a continuous line, forming a long section made up of small parts and in position to be placed bodily into the conduit, substantially as and for the purpose specified.

3. A pocket for underground conduits, consisting of sheet-metal tube D, having longitudinal slot $d$, and flanges D', in combination with rings E and bolts or clamps to clamp said rings together, uniting the two sections of tube, substantially as and for the purpose specified.

4. A pocket for underground conduits, consisting of sheet-metal tube D, having longitudinal slot $d$, and flanges D', in combination with rings E, bolts or clamps to clamp said rings together, uniting the two sections of tube, and brackets formed to receive said rings and tube-sections, substantially as and for the purpose specified.

5. The bracket C, having side frames, C', scalloped as at $c$, in combination with slotted troughs D, having flanges and rings E, substantially as and for the purpose specified.

6. The bracket C, having side frames, C', scalloped as at $c$, and cross-bars F, in combination with slotted troughs D, having flanges and rings E, provided with lugs E', substantially as and for the purpose specified.

7. The bracket C, having side frames, C', scalloped as at $c$, and cross-bars F, in combination with slotted troughs D, having flanges, rings E, provided with lugs E', and bolts G, substantially as and for the purpose specified.

8. In a conduit for electric wires, a frame provided with supporting-brackets, in combination with a series of pockets or troughs to carry the electric wires, supported by said brackets close to each other, but insulated from both the brackets and the adjacent pockets or troughs, substantially as and for the purpose specified.

In testimony of which invention I hereunto set my hand.

JOSIAH S. DU BOIS.

Witnesses:
R. M. HUNTER,
WILLIAM C. MAYNE.